Patented Mar. 23, 1954

2,673,162

UNITED STATES PATENT OFFICE 2,673,162

STABILIZED LOWER FATTY ACID ESTER OF CELLULOSE

Robert F. Williams, Jr., and Gordon D. Hiatt, Rochester, N. Y., assignors to Eastman Kodak Company, Rochester, N. Y., a corporation of New Jersey No Drawing. Application August 1, 1950, Serial No. 177,122

6 Claims. (Cl. 106—180)

This invention relates to cellulose ester compositions stabilized by incorporating therein a small proportion of an aluminum alcoholate. The stabilization effect is exerted on both the cellulose ester and the plasticizer of the composition and this invention relates to the stabilizing of both those materials with the aluminum alcoholate.

Cellulose organic acid esters are ordinarily prepared by reacting upon cellulose with acetic or some other fatty acid anhydride and sulfuric acid as a catalyst. As a consequence, the resulting esters which are obtained have a small proportion of combined sulfur therein which upon heating of the ester tends to cause discoloration and a decided decrease of the intrinsic viscosity thereof. Therefore, efforts have been made to reduce the sulfur content to as low a proportion as is possible. Even so, the presence of combined sulfur which is ordinarily present as the sulfate radical results, nevertheless, in some discoloration and decrease of intrinsic viscosity upon heating unless some stabilization agent is incorporated therein. Also the cellulose itself may have some features of instability itself.

Plasticizers as ordinarily employed for cellulose esters have also shown themselves to be susceptible to discoloration upon subjecting to an elevated temperature in the absence of some stabilizing agent therefor.

The object of our invention is to provide stabilized cellulose lower fatty acid ester compositions in which both the color and viscosity thereof are stabilized against the effect of heat and age using aluminum alcoholates.

We have found that aluminum alcoholates such as aluminum ethoxide, aluminum isopropoxide, aluminum methoxide, aluminum 2-ethyl hexoxide or, in fact any of the aluminum alcoholates of the alcohols of not more than 10 carbon atoms, are eminently suited for use as stabilizers for cellulose ester compositions. We have found that these compounds are particularly suitable for stabilizing cellulose esters in that they are not strongly alkaline. These compounds also have the advantage that they can be incorporated in the cellulose ester compositions either by incorporating them in the form of their solution in organic solvents or by mixing them with the cellulose ester composition in dry powdered form such as in the preparation of plastic compositions.

Our invention relates to the stabilizing of cellulose organic acid esters and their compositions, such as cellulose acetate, cellulose propionate, cellulose acetate propionate, cellulose butyrate, or cellulose acetate butyrate having a small proportion of residual combined sulfur, in the form of sulfur acid radicals, therein, such as within the range of .02–.001%. Some of the cellulose acetates which may be stabilized by our invention are those having an acetyl content of 38.5–42% or those cellulose acetates ordinarily regarded as triacetates and having an acetyl content of 42–44.5%. However any of the cellulose acetates may be stabilized in accordance with our invention. The butyric acid esters of cellulose which may be stabilized in accordance with our invention are either the simple esters or the acetate butyrates, both those having a high butyryl content, such as 30–55% butyryl, and those having a lower butyryl content, such as having a butyryl content of 12–20%. Also in the case of the propionic acid esters of cellulose, stabilization in accordance with our invention may be either of the simple or mixed esters and includes both those of high and low propionyl content. Some of the plasticizers which are useful in cellulose ester compositions and which may be treated in accordance with our invention are the heat resistant organic esters of aliphatic alcohols, which esters have a molecular carbon content of 9–24 carbon atoms and a molecular weight of 190–392; for instance, the phthalates of lower aliphatic alcohols of 1–8 carbon atoms are useful in this connection. Also, another set of plasticizers which may be useful are the sebacates particularly those of alcohols of 2–6 carbon atoms. The adipates of the lower aliphatic alcohols are also useful in cellulose ester compositions. Some plasticizers which are useful for preparing stabilized compositions in accordance with our invention are:

Triacetin
Tripropionin
Dibutyl sebacate
Diethyl sebacate
Dimethyl phthalate
Diethyl phthalate
Dibutyl phthalate
Di-2-ethyl hexyl phthalate
Dioctyl phthalate
Dibutyl adipate
Diethyl adipate
Methoxyethyl stearate Also included within the plasticizers within the scope of our invention are the organic phosphates such as triphenyl phosphate, tricresyl phosphate, and the halogen-containing plasticizers such as tri (2-chloroethyl) phosphate. Some types of plasticizers are better adapted for plasticizing cellulose acetate and other types are adapted for the mixed or higher esters as is known in the art.

It is also in accordance with our invention, if such procedure is preferred, to mix the plasticizer with the aluminum alcoholate, filter off the undissolved alcoholate so that a saturated solution of the alcoholate in the plasticizer results, and incorporate the so-treated plasticizer in a cellulose ester which has been partly stabilized by means of a salt, such as aluminum or barium formate or the like described and claimed in our application 127,516, now Patent No. 2,614,941, or by means of a glycidyl ether such as is taught in application Serial No. 127,515 of Malm and Williams, or by both.

The proportion of aluminum alcoholate which is incorporated in the cellulose ester is quite small. For instance, if the incorporation is directly into the cellulose ester on its composition, a proportion of aluminum alcoholate within the range of .025-1%, based on the cellulose ester, is sufficient to give the desired stabilization. If the aluminum alcoholate is incorporated first in the plasticizer, the amount used would be within the range of .025% (based on the plasticizer) up to a saturated solution of the alcoholate in the plasticizer at room temperature. When this plasticizer is employed in the cellulose ester composition, the proportion of alcoholate in such composition will ordinarily be not more than 1% based on the cellulose ester.

To incorporate the aluminum alcoholate in the cellulose ester, this may be done by means of a solution thereof in a volatile organic solvent which results in uniformity of distribution. This solvent may be the plasticizer in which the alcoholate may be dissolved or it may be some volatile solvent such as benzene or an aliphatic alcohol. The cellulose ester should be dry before mixing with the alcoholate, as substantially anhydrous conditions are desirable to avoid decomposition of the alcoholate. The alcoholate may be incorporated in dry form in the cellulose ester while that ester in the form of its composition with plasticizer is being worked up on hot rolls to form a plastic or molding composition thereof. The following table shows the effect of aluminum isopropoxide as a stabilizer on a cellulose acetate having an acetyl content of approximately 38.5% and on a cellulose actate butyrate having a butyryl content of approximately 38%:

| Ester | Gms. of Aluminum Isopropoxide/100 gm. Ester | Intrinsic Viscosity | | Color After Heating at 205° C. |
|---|---|---|---|---|
| | | Original[1] | After 2 Hrs. at 205° C. | |
| Cellulose Acetate. | 0 | 0.99 | 0.34 | Dark amber. |
| | 0.1 | 1.02 | 0.86 | Clear. |
| Cellulose Acetate-Butyrate. | 0 | 1.38 | 0.14 | Dark amber. |
| | 0.1 | 1.50 | 1.36 | Clear. |

[1] The original viscosity of the composition as indicated in the table is the viscosity of the rolled composition (to thoroughly mix) but without the 205° C. heating. Refer to article by Wagner and Russell, Ind. Eng. Chem., Anal. Ed., 20, 151-5 (1948) for use of intrinsic viscosity.

The effect of aluminum isopropoxide is shown by the data in the following table in which a cellulose acetate of approximately 38.5% acetyl content and having an intrinsic viscosity of 1.05 when mixed with 30 g. of diethyl phthalate was employed. The diethyl phthalate employed in the last line of the table was prepared for use by mixing with aluminum isopropoxide at 25° C., and after a few hours filtering off the excess solids:

| Cellulose Acetate | Barium Formate | H. D. E.[1] | Diethyl Phthalate | Heating at 205° C. | |
|---|---|---|---|---|---|
| | | | | 1 Hr. Color | 2 Hr. Int. Visc. |
| Gm. | Gm. | Gm. | Gm. | | |
| 100 | ----- | ------- | 30 | black---- | .04 |
| 100 | .01 | ------- | 30 | amber--- | .12 |
| 100 | .01 | .025 | 30 | ---do---- | .16 |
| 100 | .01 | .025 | [2]30 | v. light straw | .86 |

[1] Hydroquinone diglycidyl ether.
[2] Treated with aluminum isopropoxide.

The intrinsic viscosity measurements are indicative of the degree of general chain breakdown. A cellulose ester composition to be useful for plastic purposes should not be degraded to any appreciable extent, as may be determined by the value obtained in these tests. The intrinsic viscosity is determined by measuring the flow rate of a solution of 0.25 g. of the test composition made up to 100 cc. with formic acid. A measure of the flow time itself gives the relative viscosity.

$$\text{Relative viscosity } (n)_r = \frac{\text{flow time for solution}}{\text{flow time for solvent}}$$

$$\text{Intrinsic viscosity } (n) = 9.21 \log (n)_r$$

The preparation of cellulose esters having low sulfur content is described in an article by Malm, Tanghe, and Laird in Industrial and Engineering Chemistry, vol. 38, page 77, January 1946. That disclosure is to be considered as part of this specification. The preparations described in that article were carried out on a laboratory scale and on a larger scale the water may be added during the hydrolysis at a more rapid rate providing the stirring uniformly distributes the water through the esterification mass and, yet, the combined sulfur in the cellulose ester is kept at a minimum.

In the analysis of cellulose esters, even though the combined sulfur is present as sulfate radical, the determination is made on the basis of sulfur itself. Therefore whenever combined sulfur is referred to herein, it is to be understood as being the figure arrived at on analysis which is indicative of the amount of combined sulfate radical present therein.

Our invention applies to cellulose esters of fatty acids of 2-4 carbon atoms, either simple or mixed. Some of the esters are hydrolyzed such as to introduce .1-.5 hydroxyl groups per $C_6$ unit of cellulose. Other of the esters are slightly hydrolyzed so that the hydroxyl content thereof is not appreciable. In the case of the cellulose acetates the esterifying liquid is made up primarily of acetic anhydride, acetic acid and sulfuric acid catalyst. In the case of the cellulose acetate butyrates the esterifying liquid may be made up either of butyric anhydride, acetic acid, and sulfuric acid catalyst, or of acetic anhydride, butyric acid, and sulfuric acid catalyst depending on whether a high or low butyryl ester is desired. The proportion of catalyst employed in the esterification may be from 1.5 to 10% of sulfuric acid based on the dry weight of the cellulose. Ordinarily, to obtain esters of good viscosity the esterification temperature is not allowed to rise above 100° F., although the esterification temperatures employed depend somewhat upon the proportion of sulfuric acid catalyst used, the more catalyst present in the esterification mass, the more important it becomes that the temperature of the reaction mass be carefully controlled. In order to terminate the esterification, water, ordinarily in the form of aqueous acetic acid, is added to the reaction mass in a sufficient proportion to convert the residual acetic anhydride to acetic acid. Also added to the mass either in this addition or in the aqueous acid which may be added to initiate the hydrolysis is a neutralizing agent which combines with a considerable proportion of the sulfuric acid to form a salt which is insoluble in the reaction mixture. Magnesia or magnesium compounds of weak acids, i. e. magnesium carbonate, have been found to be especially useful for this purpose as the magnesium sulfate formed is insoluble in the reaction mass. Where a substantially fully esterified ester is prepared, it is desirable to process the ester by adding aqueous acid to the reaction mass and the neutralizing agent is conveniently added to the mass with this aqueous acid. The ester is then precipitated and the combined sulfuric acid in the final ester is held to a value within the range of .02–.001%. If hydrolysis is desired, the greater portion of the catalyst which is present is neutralized and the hydrolysis is carried out but the combined sulfuric acid in the final ester is thereby held to a sulfur content of .02–.001%.

In carrying out the hydrolysis of the cellulose ester the water in the form of aqueous acid which is added to the mass should be added at such a rate that it is uniformly worked into the hydrolysis mixture. Also, the addition and the hydrolysis should be at a temperature within the range of 110–180° F. After the ester has been hydrolyzed to the desired extent which is ordinarily to impart .05–.5 hydroxyls per C₆ cellulose units the ester is precipitated by the addition of aqueous acid to recover the ester. The ester is then given a thorough washing in water, preferably several washes with water having a low mineral content, such as less than 20 p. p. m., such as distilled water or Permutit-treated water.

As an addition to the compounding mixer, the stabilizing aluminum alcoholate may be added at that point if desired.

The cellulose esters in accordance with our invention are useful for any of the well-known uses for cellulose esters but are particularly useful for plastic or melt-coating compositions where high temperatures are employed. For plastic compositions of cellulose acetate butyrate having high butyryl contents it is ordinarily desirable to incorporate 5–20% of plasticizer and with melt-coating compositions up to 50% of plasticizer may be employed. In the case of cellulose acetate ordinarily 25–40 parts of plasticizer are employed per 100 parts of cellulose ester to make plastic compositions, which proportions are useful in using the esters stabilized in accordance with our invention.

The aluminum alcoholates have a stabilizing effect not only on cellulose esters as pointed out herein, but also on plasticizers. This effect is obtained whether the alcoholate is incorporated directly into the cellulose ester composition or is first incorporated in the plastic and the plastic is then incorporated in the cellulose ester composition. In some cases, it may be desired to incorporate one type of stabilizer in the cellulose ester and aluminum alcoholates for stabilizing of the plasticizer. In such cases where the plasticizer and cellulose ester are joined together in the composition, the stabilizing effect may be due to both the stabilizer for the cellulose ester and the alcoholate used for the plasticizer which, as pointed out above, also has an effect on the cellulose ester.

The following table illustrates the stabilizing effect of the aluminum alcoholates on the plasticizers themselves:

| Plasticizer | Conc. of Aluminum Isopropoxide | Color After ½ Hr. at 250° C. | Percent Free Acidity After ½ Hr. at 250° C. |
|---|---|---|---|
| Tripropionin | Saturated | Clear | .029 |
| Do | None | Brown | .047 |
| Dimethyl Phthalate | Saturated | Clear | .016 |
| Do | None | Brown | .024 |

The aluminum alcoholates which are useful in stabilizing the constituents of cellulose ester compositions in accordance with our invention are the alcoholates of any of the alcohols up to 10 carbon atoms and include the aluminum mono, di and tri alcoholates in every case where these various compounds are known. The phenates are useful for stabilizing and includes the use of those compounds as well as the compounds in which alkyl or aralkyls are present.

Some of the aluminum alcoholates which are eminently suited for stabilizing cellulose esters in accordance with our invention are the aluminum alcoholates of the following:

Ethyl alcohol
Propyl alcohol
Isopropyl alcohol
Butyl alcohol
Isoamyl alcohol
Phenol alcohol
Benzyl alcohol
Cyclohexanol Also the partial alcoholates such as

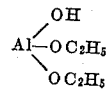

are useful for stabilizing in accordance with our invention.

We claim:

1. A composition essentially consisting of a lower fatty acid ester of cellulose and a plasticizer which composition contains a stabilizing amount of an aluminum lower alkoxide.

2. A composition essentially consisting of a lower fatty acid ester of cellulose and a plasticizer which composition contains a stabilizing amount of aluminum isopropoxide.

3. A composition essentially consisting of a lower fatty acid ester of cellulose and a plasticizer which composition contains a stabilizing amount of aluminum ethoxide.

4. A composition essentially consisting of cellulose acetate and tripropionin which composition contains a stabilizing amount of an aluminum lower alkoxide.

5. A composition essentially consisting of a lower fatty acid ester of cellulose and a plasticizer which composition contains .01–.5% of a formate selected from the group consisting of the formates of aluminum, barium and magnesium and a stabilizing amount of an aluminum lower alkoxide.

6. A composition essentially consisting of a lower fatty acid ester of cellulose and a plasticizer which composition contains .01–.5% of aluminum formate and a stabilizing amount of an aluminum lower alkoxide.

ROBERT F. WILLIAMS, Jr.
GORDON D. HIATT.

References Cited in the file of this patent

UNITED STATES PATENTS

| Number | Name | Date |
|---|---|---|
| 1,607,474 | Mork | Nov. 16, 1926 |
| 2,125,961 | Shoemaker | Aug. 9, 1938 |
| 2,154,822 | Quisling | Apr. 18, 1939 |
| 2,241,251 | Franklin | May 6, 1941 |
| 2,329,705 | Dreyfus | Sept. 21, 1943 |
| 2,333,577 | Koch | Nov. 2, 1943 |
| 2,453,634 | Marple | Nov. 9, 1948 |

OTHER REFERENCES

Meerwein et al: Liebig Ann. der Chem., 476 (1929), page 133.

Chem. Rev., 14 (1934), 401.